United States Patent [19]

Shiokawa et al.

[11] Patent Number: 4,853,702
[45] Date of Patent: Aug. 1, 1989

[54] RADIO WAVE RECEIVING SYSTEM

[75] Inventors: Takayasu Shiokawa, Japan; Koji Yasukawa, both of Tokyo; Yoshio Karasawa, Tanashi, all of Japan

[73] Assignee: Kokusai Denshin Denwa Kabushiki Kaisha, Tokyo, Japan

[21] Appl. No.: 743,883

[22] Filed: Jun. 12, 1985

Related U.S. Application Data

[63] Continuation of Ser. No. 355,949, Mar. 8, 1982, Pat. No.

[30] Foreign Application Priority Data

Mar. 27, 1981 [JP] Japan ................... 56-044100

[51] Int. Cl.$^4$ ............... H01Q 21/24; H01Q 25/00
[52] U.S. Cl. ................... 342/363; 342/352; 342/361
[58] Field of Search ............ 342/361, 362, 363, 350, 342/352, 434, 435, 366

[56] References Cited

U.S. PATENT DOCUMENTS

| | | | |
|---|---|---|---|
| 3,357,013 | 12/1967 | Hart | 343/361 X |
| 3,453,622 | 7/1969 | McKesson | 343/361 |
| 3,883,872 | 5/1975 | Fletcher et al. | 343/363 |
| 4,087,818 | 5/1978 | Kreutel, Jr. | 343/361 X |
| 4,257,048 | 3/1981 | Yokoi et al. | 342/372 X |
| 4,283,795 | 8/1981 | Steinberger | 343/361 X |
| 4,336,542 | 6/1982 | Bielli et al. | 343/352 X |
| 4,403,222 | 9/1983 | Bitter, Jr. et al. | 343/361 X |

Primary Examiner—Thomas H. Tarcza
Assistant Examiner—John B. Sotomayor
Attorney, Agent, or Firm—Pollock, VandeSande and Priddy

[57] ABSTRACT

A radio wave receiving system comprises an antenna having at least two antenna elements, a phase shifter connected to at least one of the antenna elements, and a combiner for combining signals passed through the phase shifter and other signals not passed through the phase shifter. Through proper control of the mutual phase difference between signals from the aforementioned antenna elements by using the phase shifter, the system alters the polarization characteristic of the antenna in the direction of incidence of undesired reflected waves and consequently supresses the fading due to undesired reflected waves.

11 Claims, 6 Drawing Sheets (I) ($\delta = 0°$)  (II) ($\delta = 30°$)  (III) ($\delta = 60°$)  (IV) ($\delta = 90°$)

RADIO WAVE RECEIVING SYSTEM

This application is a continuation of application Ser. No. 355,949, filed Mar. 8, 1982, now abandoned.

FIELD OF THE INVENTION

This invention relates to a radio wave receiving system for use in radiocommunication, which is configured to reduce degradation of signal strength due to the incidence of reflected waves such as from the sea surface.

DESCRIPTION OF THE PRIOR ART:

Generally, in the installation of circuits for line of sight radiocommunication, the practice of properly selecting a radio wave path in advance to avoid the presence of reflected waves from the sea surface and, at the same time, adopting antennas having sharp directivity to minimize the influence of reflected waves has found widespread acceptance. In the case of a propagation path over sea, there are times when the influence of reflected waves from the sea surface are inevitably suffered because of the location of a ship station on the sea. To cope with the situation, the diversity reception system in which a plurality of antennas are used and the system in which a plurality of antenna directivities are effectively synthesized so as to null substantially the synthesized directivity in the direction of incidence of reflected waves from the sea surface have heretofore been developed.

An attempt to apply the aforementioned diversity reception system to shipborne antenna for maritime satellite communication, which has been given increasing attention in recent years, has proven to be unfeasible because the space available for the installation of communication equipment is limited or because use of a plurality of antenna units has been rejected from the economic point of view. Besides, the antennas of which the radiation pattern is synthesized are also not desirable because of their large volume. In maritime satellite communication, therefore, it is desirable to adopt a system which is simplified to the fullest possible extent, provides highly efficient control of the effects of reflected waves, and takes up no large space.

From this standpoint, there have been recently invented a few methods which realize the large effect of suppressing the fading of received waves due to undesired reflected waves by using only one antenna. One of them is aimed at suppressing the fading by signal strength to become higher level in accordance with the variation in the fading and thereby keeping the signal strength (the sum of the signal directly entering the antenna and the signal once reflected on the sea surface, for example, and then brought into the antenna) constantly enhanced.

These systems can be applied rather easily to an array antenna of the type provided with a plurality of feeding elements. It nevertheless has the disadvantage that its application is hardly feasible to an aperture antenna having a single feeding element such as, for example, an parabolic antenna or short backfire antenna.

SUMMARY OF THE INVENTION

An object of this invention is to reduce notably the fading of received radio waves due to undesired reflected waves by a simple method which is applicable to any types of antenna.

This invention provides a radio wave receiving system which comprises an antenna having at least two antenna elements, a phase shifter connected to at least one of the antenna elements, and a combiner for combining signals passed through the phase shifter and signals not passed through the phase shifter, and the system is characterized by the fact that the fading of received radio waves due to the reflected waves is suppressed by controlling the polarization characteristic of the antenna toward the direction of incidence of undesired reflected waves through proper control of the mutual phase difference between the aforementioned antenna elements by using the phase shifter.

DETAILED DESCRIPTION OF THE INVENTION:

First, the principle of a novel system for the reduction of fading according to the present invention which takes notice of particular emphasis to polarization will be described. In the first place, the nature of the polarization of reflected waves from the sea surface will be described with reference to maritime satellite communication.

Figure 1:
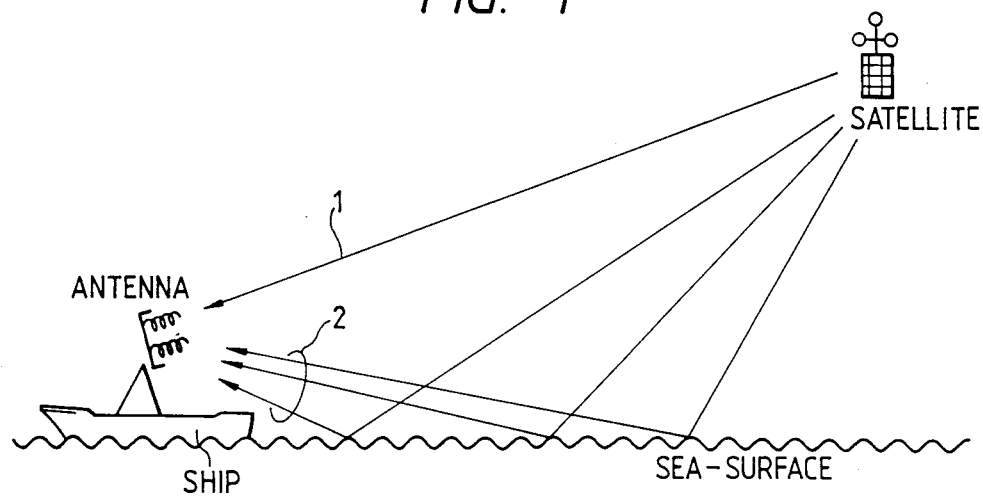
FIG. 1 is a schematic explanatory diagram illustrating the reception of radio waves from a satellite on a ship.
Figure 2A:
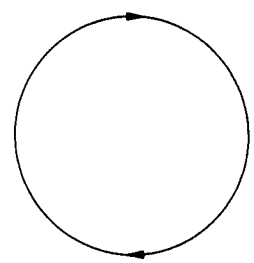
FIGS. 2(a) and 2(b) are explanatory diagrams of the polarization shape of direct waves and reflected waves.
Figure 2A:
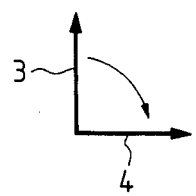
Figure 2B:
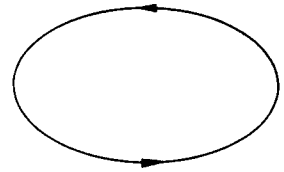
Figure 2B:
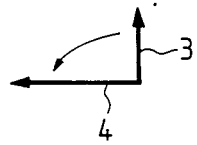

When the radio waves from a satellite are received on a ship as illustrated in FIG. 1, the radio waves which are received by the antenna on a ship may be divided into direct waves 1 which arrive directly from the satellite and reflected waves 2 which are reflected from the sea surface and are then incident on the antenna. If we assume that the waves transmitted from the satellite are perfect right-handed circularly polarized waves, the direct waves 1 travelling from the satellite directly to the ship will be prefect right-handed circularly polarized waves as shown in FIG. 2 (a). On the contrary, the reflected waves 2, in the maritime satellite communication, generally will be left-handed elliptically polarized waves having the major axis in the horizontal direction as illustrated in FIG. 2 (b). In the diagram of FIG. 2, numeral 3 denotes the vertically polarized wave component and 4 the horizontally polarized wave component, respectively, of the circularly polarized waves.

The reason why the reflected waves from the sea surface from left-handed elliptically polarized waves unlike the direct waves 1 will be described with reference to FIG. 3.

Figure 3:
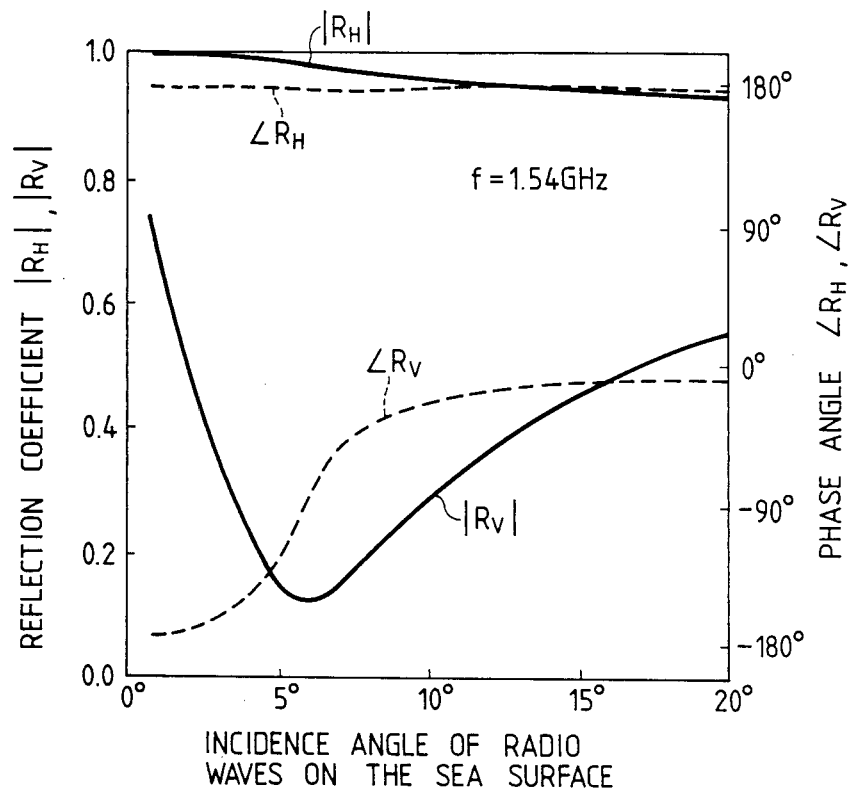
FIG. 3 is a characteristic diagram showing the reflection coefficient amplitude and phase relative to the incidence angle of radio waves on the sea surface.

In FIG. 3, $|R_H|$ and $|R_V|$ denote the magnitudes of reflection coefficients, respectively, of the horizontally and vertically polarized waves on the sea surface of the radio waves in the frequency band (1.54 GHz band) used in the maritime satellite communication and $<R_H$ and $<R_V$ denote the corresponding phase angles, respectively.

If the sea surface were a flat perfect conductor, the amplitude of the horizontally polarized wave component would remain constant without reference to the angle of incidence upon the sea surface but its phase would be varied by 180°. On the other hand, both the amplitude and phase of the vertically polarized wave component would remain constant without reference to the angle of incidence upon the sea surface. The reflected waves corresponding to the reflected waves 2 of FIG. 1, therefore, would form reversely-handed perfect circularly polarized waves.

In actuality, however, the sea surface is not a flat perfect conductor. Consequently, the phase of the vertically polarized wave component is reversed when the angle of incidence approximates 6° as illustrated in FIG. 3. On the other hand, even if the angle of incidence is greater than about 6° the phase of the horizontally polarized wave component remains unchanged. Therefore, as in the case of a perfect conductor, there ensures the reversion of the circular polarization of radio waves by the reflection. When the angle of incidence is smaller than about 6°, however, the phase of both the horizontally and vertically polarized waves are not reversed. Hence, waves circularly polarized in the same direction as the incident waves are reflected.

Figure 4:
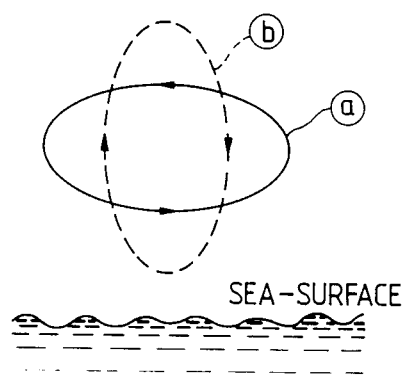
FIG. 4 is an explanatory diagram of the relation between the polarization characteristic of reflected waves from the sea surface and the elliptic polarization characteristic of an antenna orthogonal to the reflected waves.

As noted from the curves of reflection coefficient, $|R_H|$ and $|R_V|$, of the horizontally and vertically polarized waves illustrated in FIG. 4, $|R_H|$ is varied very little by the angle of incidence, whereas $|R_V|$ is attenuated most when the angle of incidence is in the neighborhood of 6°. The attenuation decreases in proportion as the angle of incidence increases beyond this level.

When the angle of incidence falls in the range of about 5° to 10° in which the effects of the reflected waves from the sea surface pose a problem to the maritime satellite communication, the reflected waves from the sea surface from reversely-handed elliptically polarized waves as shown in FIG. 2 (b). These elliptically polarized waves fairly approach linearly (horizontally) polarized waves in the neighborhood of 6°, as the attenuation of the vertically polarized wave component is fairly heavy in this incidence angle. And they also approach circularly polarized waves as the angle of incidence increases. Theoretically, it may be generally concluded that the aforementioned nature of the reflected waves from the sea surface remains unchanged despite the roughness of the sea, namely the condition of the sea surface.

The prerequisite for the present invention, therefore, resides in causing the polarization characteristic of the antenna in the direction of incidence of reflected waves to be orthogonal to the polarization characteristic of reflected waves in due consideration of the aforementioned nature of the reflected waves from the sea surface. To be specific, the reception of reflected waves can be suppressed and the fading can be consequently alleviated by fixing the elliptical polarization characteristic (b) of the antenna so as to be orthogonal to the polarization characteristic of the reflected waves from the sea surface as illustrated in FIG. 4.

Now, preferred embodiments of the present invention will be described in detail with reference to the accompanying drawings.

Figure 5A:
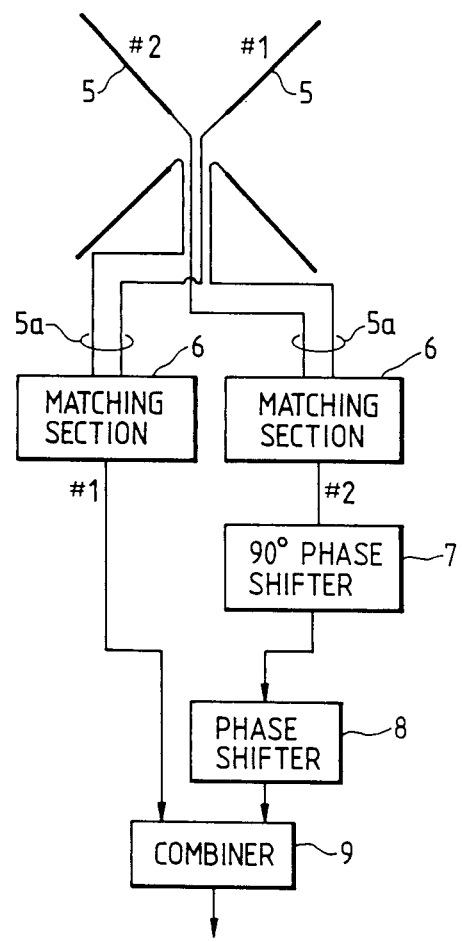
FIG. 5 (a) is a block diagram of one embodiment of this invention and FIG. 5 (b) is an explanatory diagram of the polarization characteristic of the antenna as affected by the variation in the amount of phase value of the variable phase shifter in the configuration of FIG. 5 (a).
Figure 5B:
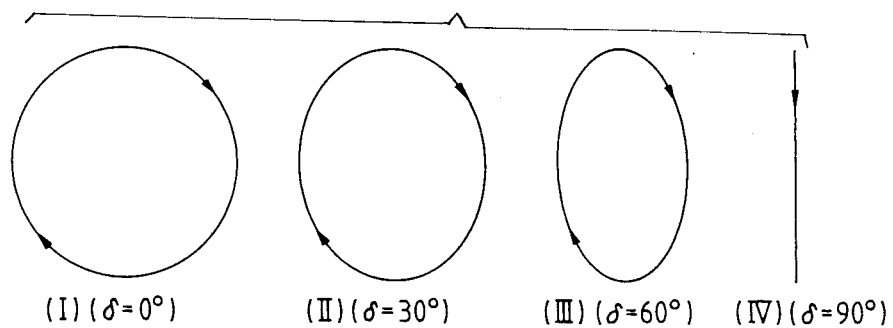
Figure 12:
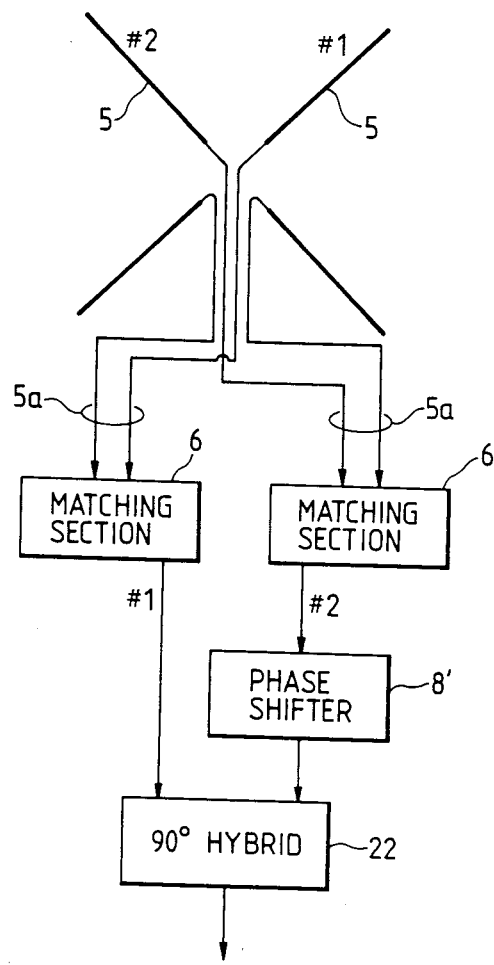

FIG. 5 (a) illustrates the first embodiment of this invention which is formed of two linearly polarized antenna elements. In the diagram, 5 denotes an antenna comprising of a couple of linearly polarized antenna elements, 5a denotes one pair of feeders, 6 is a matching section which serves to match said linearly polarized antenna elements with said feeders, 7 is a 90° phase shifter for completing a circularly polarized antenna, 8 is a variable phase shifter for controlling the polarization characteristic, 9 is a combiner. The dipoles forming the antenna element 5 are disposed at an angle of about 45° relative to the sea surface. In the block diagram of FIG. 5 (a), the 90° phase shifter 7 may be omitted and a 90° hybrid 22 may be used in lieu of the combiner 9 as illustrated in FIG. 12.

The function of the driving circuit for the antenna of the aforementioned construction will be described below. The transmitted radio waves are received by the cross dipole antenna which is composed of two linearly polarized antenna elements 5. The radio waves received by the first dipole antenna #1 are forwarded through the matching section 6 to the combiner 9. The radio waves received by the second dipole antenna #2, are passed through the matching section 6 and then transferred via the 90° phase shifter 7 to the variable phase shifter 8.

In the variable phase shifter 8, the waves received undergo variations in phase. In the combiner 9, the resultant waves from the variable phase shifter 8 are combined with the waves received through the first dipole antenna #1.

FIG. 5 (b) illustrates the polarization characteristic of the antenna vs. the amount of phase shift (δ) of the variable phase shifter 8 in the antenna of the construction of FIG. 5 (a). When the amount of phase shift (δ) is 0°, there are produced perfect circulatory polarized waves as shown in (i) of FIG. 5 (b). As δ increases, these waves are gradually transformed into waves elliptically polarized in the vertical direction as shown in (ii), (iii) of the same diagram. When δ increases to 90°, they are transformed into perfect linearly polarized waves (vertical) as shown in (iv) of the same diagram. Thus, desired elliptically polarized waves intervening between circularly polarized waves and linearly polarized waves can be realized by suitably changing the value of δ. As pointed out in the description of the prerequisite of this invention, the direction of the major axis of the elliptically polarized waves formed by the dipoles #1 and #2 is required to be perpendicular to the sea surface as illustrated in FIG. 4. Consequently, the dipole antenna of FIG. 5 (a) must be disposed at an angle of about 45° relative to the sea surface. In other words, the two dipoles of FIG. 5(a) must be disposed in such a manner that they are both in a plane perpendicular to the surface of the sea and individually incline at an angle of about 45° relative to the surface of the sea.

By the first embodiment of this invention described above, the reception of reflected waves can be suppressed because the polarization characteristic of the antenna can be made to be orthogonal to the polarization of the reflected waves (the prerequisite of this invention).

In the above mentioned preferred embodiment, however, the polarization characteristic of the antenna is changed not merely in the direction of incidence of the reflected waves but also in the direction of incidence of direct waves. This situation will be described with reference to FIG. 6.

Figure 6:
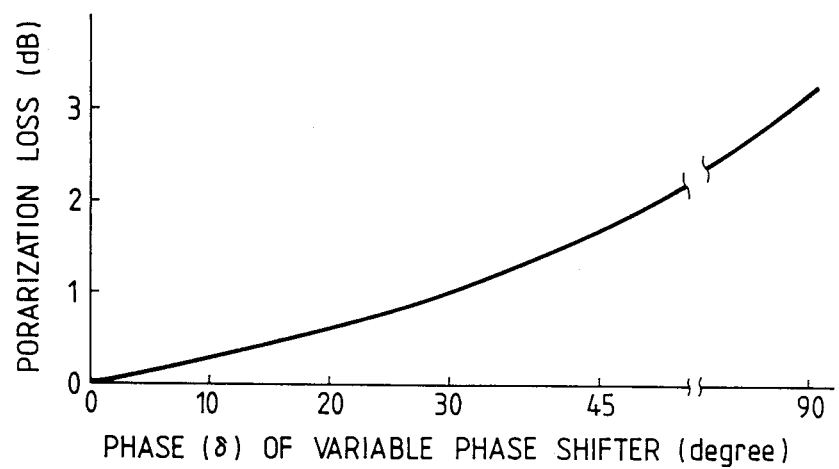
FIG. 6 is a characteristic diagram of the polarization loss as the function of the amount of phase value of the variable phase shifter in the configuration of FIG. 5 (a).

FIG. 6 shows the polarization loss of the perfect circularly polarized waves vs. the amount, δ, of phase shift of the variable phase shifter 8. In FIG. 6, since the waves travelling directly from the satellite to the antenna are perfect circularly polarized waves, the polarization loss becomes 0 dB when the amount of phase shift, δ, of the variable phase shifter 8 is 0. The polarization loss, however, increases in proportion as δ becomes larger. Where δ=90°, there exists about 3 dB of polarization loss.

When the dipole antenna illustrated in FIG. 5 (a) is used without a device for the reduction of fading (beam width is about 70°) or when it is used as a primary radiator for the short backfire as described afterward (shown in FIG. 8) (beam width is about 40°), it is known that the reflected waves generally produce a fading in the order of −10 to −20 dB. This fading is notably reduced by using the antenna of the present embodiment.

The foregoing statement may allude to possible occurrence of the polarization loss up to about 3 dB relative to the direct waves by the antenna of the present embodiment. Fortunately, however, the suppression of the reflected waves in the direction of their incidence is effected to the extent of more than making up for the polarization loss in the direct waves. As a result, the antenna is capable of notably suppressing possible degradation of the signal strength.

The foregoing description has, for simplicity of explanation, been made with respect to an arrangement in which the antenna is in a plane perpendicular to the surface of the sea. In the case of mobile communication such as maritime satellite communication, it is a customary practice for the antenna to be caused to track the satellite. In this case, the same effect is obtained as in the first embodiment described above by adapting the dipoles, #1 and #2, so that they will each assume an angle of about 45° relative to the major axis of the undesired wave from the sea surface.

Figure 7:
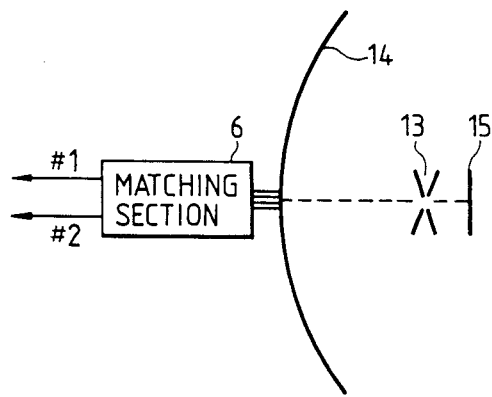
FIGS. 7, 8, 9, 10, 11, and 12 are schematic diagrams each of which shows an essential part in a modified embodiment of the present invention.

The second preferred embodiment of this invention will be described below with reference to FIG. 7. This embodiment is the outcome of the union of the dipole of the first embodiment and a parabolic antenna. In the diagram, 13 denotes the same antenna system as illustrated in FIG. 5 (a), 14 is a main reflection plate or main reflection mirror, and 15 is an auxiliary reflection plate or auxiliary reflection mirror. Although the feed circuit which follows the matching section 6 is omitted from the diagram, it is used in the same manner as in the first embodiment.

Figure 8:
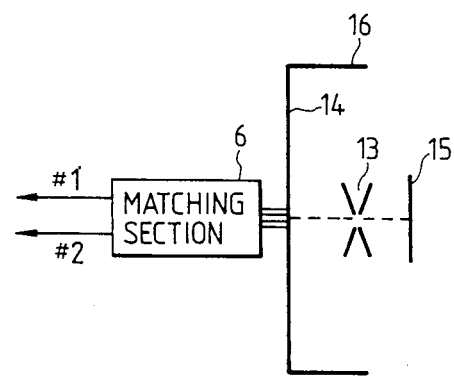

FIG. 8 illustrates the third preferred embodiment of this invention, which is characterized by using a short backfire antenna. In the diagram, 16 denotes a cylindrical metal rim and the other numeric symbols denote components similar to those bearing the same numeric symbols in FIG. 7. Although the feeder circuit which follows the matching section 6 is omitted from the diagram, it is used in the same manner as in the first embodiment.

Figure 9:
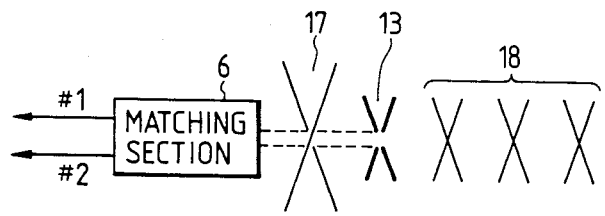

FIG. 9 illustrates the fourth embodiment of this invention, which is characterized by using a cross Yagi antenna. In the diagram, 17 denotes a reflector, 18 is a waveguide element, and the other numeric symbols denote components similar to those bearing the same numeric symbols in FIG. 7. Although the feeder circuit which follows the matching section 6 is omitted from the diagram, it is used in the same manner as in the first embodiment.

The radio wave receiving systems of the second through fourth embodiments described above have higher gains than the antenna of the first embodiment.

It is apparent that the fading caused by the reflected waves can be effectively alleviated by guiding the radio waves received through these antennas to the same feeder circuit as used in the first embodiment. These radio wave receiving systems may be advantageously used where the directions of incidence of direct waves and that of reflected waves are relatively close to each other.

Figure 10:
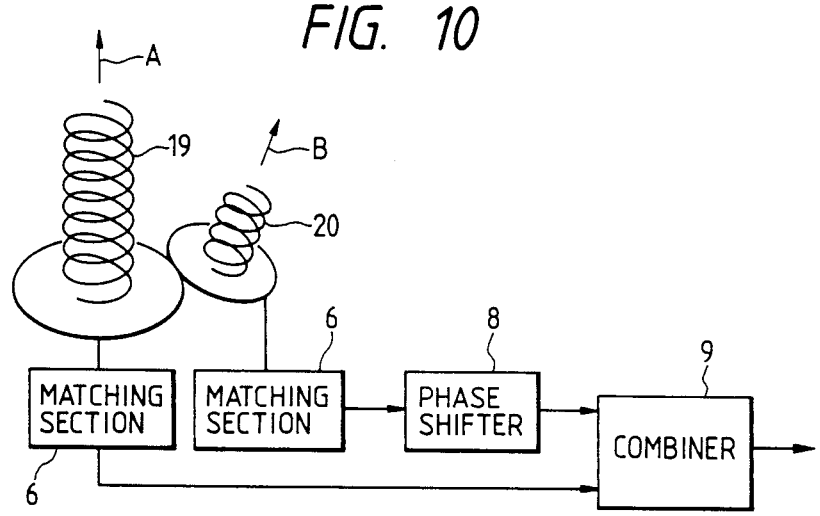

Next, the fifth embodiment of the present invention will be described with reference to FIG. 10. This embodiment is characterized by using an antenna obtained by combining a circularly polarized main antenna element and a circularly polarized auxiliary antenna element. In the diagram, 19 denotes a circularly polarized main antenna element, 20 denotes a circularly polarized auxiliary antenna element and the other numeric symbols denote components similar to those bearing the same numeric symbols in FIG. 5 (a).

Figure 11:
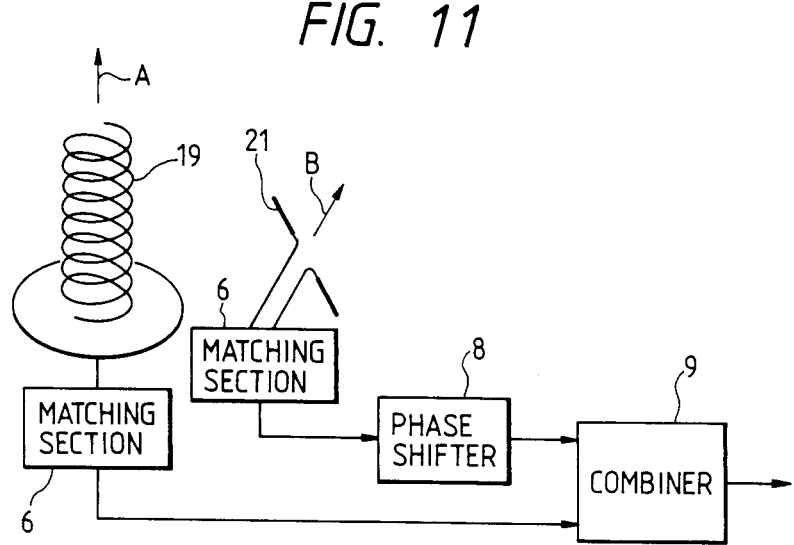

FIG. 11 illustrates the sixth embodiment of the present invention. This embodiment is characterized by using the combination of a circularly polarized main antenna element 19 and a linearly polarized auxiliary antenna element (dipole) 21. In the diagram, the other numeric symbols denote components similar to those bearing the same numeric symbols in FIG. 5 (a).

In the fifth and sixth embodiments mentioned above, the circularly polarized main antenna element 19 is disposed in the direction of incidence of direct waves (shown by arrow A) and the auxiliary antenna elements 20, 21 are disposed in the direction of incidence of reflected waves (shown by arrow B). In these embodiments, desired reduction of the fading can be realized by causing exclusively the reflected waves received through the auxiliary antenna elements to approximate the desired polarization characteristic.

The radio wave receiving systems of these embodiments may be advantageously used where the directions of incidence of direct waves and that of reflected waves are separated from each other.

As described above, the present invention alters the polarization characteristic of the output of a variable phase shifter in the direction of incidence of undesired reflected waves, and makes the reflected waves in phase with the direct waves by using an antenna combining at least two linearly polarized antenna elements or as many circularly polarized antenna elements or combining a circularly polarized antenna element and a linearly polarized antenna element and controlling the mutual phase difference of signals received by such two or more antenna elements. Thus, it provides an ample reduction of the effects of the fading. In accordance with this invention, therefore, the degradation of signal strength caused by the reflected waves such as from the sea surface can be precluded.

What is claimed is:

1. A radio wave receiving system for use with a shipborne antenna in a maritime satellite communication system, comprising a circularly polarized antenna having two independent linearly polarized antenna elements disposed to intersect each other perpendicularly, each of said antenna elements being inclined at an angle of about 45° relative to the major axis of the polarization characteristics of an undesired wave reflected from the surface of the sea, two pairs of feeders connected respectively to said two independent linearly polarized antenna elements, a 90° phase shifting circuit connected through one of said pairs of feeders to one of said linearly polarized antenna elements, a phase shifter serially connected to said 90° phase shifting circuit for controlling the mutual phase between said two linearly polarized antenna elements and operative to adjust the axial ratio of the polarization characteristics of said circularly polarized antenna, and a combiner for combining the output signal of said phase shifter and the signal received by the other of said linearly polarized antenna elements which has been forwarded to said combiner via the other of said pairs of feeders, whereby reception of the said undesired reflected wave is avoided by selecting the amount of phase shift of said phase shifter and causing the polarization characteristics of said circularly polarized antenna to intersect perpendicularly the polarizing characteristics of said undesired wave.

2. A radio wave receiving system according to claim 1 wherein said two pairs of feeders are matched in impedance with said two independent linearly polarized antenna elements respectively.

3. A radio wave receiving system for use with a shipborne antenna in a maritime satellite communication system, comprising a circularly polarized antenna having two independent linearly polarized antenna elements disposed to intersect each other perpendicularly, each of said antenna elements being inclined at an angle of about 45° relative to the major axis of the polarization characteristics of an undesired wave reflected from the surface of the sea, two pairs of feeders connected respectively to said two independent linearly polarized antenna elements, two matching sections for matching the impedances of said linearly polarized antenna elements with said two pairs of feeders respectively, a 90° phase shifting circuit connected through one of said pairs of feeders and one of said matching sections to one of said linearly polarized antenna elements, a phase shifter serially connected to said 90° phase shifting circuit for controlling the mutual phase between said two linearly polarized antenna elements and operative to adjust the axial ratio of the polarization characteristics of said circularly polarized antenna, and a combiner for combining the output signal of said phase shifter and the signal received by the other of said linearly polarized antenna elements which has been forwarded to said combiner via the other of said pairs of feeders and the other of said matching sections, whereby reception of the said undesired reflected wave is avoided by selecting the amount of phase shift of said phase shifter and causing the polarization characteristics of said circularly polarized antenna to intersect perpendicularly the polarizing characteristics of said undesired wave.

4. A radio wave receiving system for use with a shipborne antenna in a maritime satellite communications system, comprising a circularly polarized antenna having two independent linearly polarized antenna elements disposed to intersect each other perpendicularly, each of said antenna elements being inclined at an angle of about 45° relative to the major axis of the polarization characteristics of an undesired wave reflected from the surface of the sea, two pairs of feeders connected respectively to said two independent linearly polarized antenna elements, a phase shifter connected through one of said pairs of feeders to one of said linearly polarized antenna elements and adapted to control the mutual phase between said two linearly polarized antenna elements and to adjust the axial ratio of the polarization characteristics of said circularly polarized antenna, and a 90° hybrid receiving both the output signal of said phase shifter and the signal received by the other of said linearly polarized antenna elements which has been forwarded to said hybrid via the other of said parts of feeders, whereby reception of said undesired reflected wave is avoided by selecting the amount of phase shift of said phase shifter and causing the polarization characteristics of said circularly polarized antenna to intersect perpendicularly the polarizing characteristics of said undesired wave.

5. A radio wave receiving system according to claim 4 wherein said two pairs of feeders are matched in impedance with said two independent linearly polarized antenna elements respectively.

6. A radio wave receiving system for use with a shipborne antenna in a maritime satellite communications system, comprising a circularly polarized antenna having two independent linearly polarized antenna elements disposed to intersect each other perpendicularly, each of said antenna elements being inclined at an angle of about 45° relative to the major axis of the polarization characteristics of an undesired wave reflected from the surface of the sea, two pairs of feeders connected respectively to said two independent linearly polarized antenna elements, two matching sections for matching the impedance of said linearly polarized antenna elements with the impedances of said two pairs of feeders respectively, a phase shifter connected through one pair of said feeders to one of said linearly polarized antenna elements and adapted to control the mutual phase between said two linearly polarized antenna elements and to adjust the axial ratio of the polarization characteristics of said circularly polarized antenna, and a 90° hybrid receiving both the output signal of said phase shifter and the signal received by the other of said linearly polarized antenna elements which has been forwarded to said hybrid via the other pair of feeders and the other of the matching sections, whereby reception of said undesired reflected wave is avoided by selecting the amount of phase shift of said phase shifter and causing the polarization characteristics of said circularly polarized antenna to intersect perpendicularly the polarizing characteristics of said undesired wave.

7. A radio wave receiving system according to claim 1, 2, 3, 4, 5, or 6, where said amount of phase shift of said phase shifter is prefixed to a value determined by the angle of incidence of the incoming radio wave on the surface of the sea in such a manner that said antenna will assume polarization characteristics of the highest possible frequency.

8. A radio wave receiving system according to claim 1, 2, 3, 4, 5 or 6, wherein said circularly polarized antenna is a cross dipole antenna.

9. A radio wave receiving system according to claim 8 wherein said circularly polarized antenna is used as a feeder element for a parabolic antenna.

10. A radio wave receiving system according to claim 8 wherein said circularly polarized antenna is used as a feeder element for a short backfire antenna.

11. A radio wave receiving system according to claim 8 wherein said circularly polarized antenna is used as a feeder element for a cross Yagi antenna.

* * * * *